United States Patent
Cromer et al.

(10) Patent No.: US 6,421,792 B1
(45) Date of Patent: Jul. 16, 2002

(54) DATA PROCESSING SYSTEM AND METHOD FOR AUTOMATIC RECOVERY FROM AN UNSUCCESSFUL BOOT

(75) Inventors: Daryl Carvis Cromer; Isaac Karpel; Howard J. Locker, all of Cary; James Peter Ward, Raleigh, all of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/204,983

(22) Filed: Dec. 3, 1998

(51) Int. Cl.[7] .............................................. G06F 9/445
(52) U.S. Cl. ............................................ 714/36; 713/2
(58) Field of Search ........................... 713/2, 1, 100; 714/15, 36; 710/10

(56) References Cited

U.S. PATENT DOCUMENTS

| | | | | |
|---|---|---|---|---|
| 5,450,576 A | * | 9/1995 | Kennedy | |
| 5,564,054 A | * | 10/1996 | Bramnick et al. | |
| 5,708,776 A | * | 1/1998 | Kikinis | |
| 5,732,268 A | * | 3/1998 | Bizzarri | |
| 5,765,151 A | * | 6/1998 | Sentor | 707/8 |
| 5,922,072 A | * | 7/1999 | Hutchinson et al. | 713/2 |
| 5,956,475 A | * | 9/1999 | Bruckhartt et al. | |
| 5,974,546 A | * | 10/1999 | Anderson | 713/2 |
| 6,014,744 A | * | 1/2000 | McKaughan et al. | 713/2 |
| 6,061,788 A | * | 5/2000 | Reynaud et al. | 713/2 |
| 6,079,016 A | * | 6/2000 | Park | 713/2 |
| 6,182,187 B1 | * | 1/2001 | Cox et al. | 711/5 |
| 6,230,285 B1 | * | 5/2001 | Sadowsky et al. | 714/14 |

* cited by examiner

*Primary Examiner*—Paul R. Myers
(74) *Attorney, Agent, or Firm*—Andrew Dillon; J. Bruce Schelkopf

(57) ABSTRACT

A data processing system and method are disclosed for automatically recovering from an unsuccessful boot of the system. A boot of the system is initiated utilizing a first boot code stored in a first storage location. A determination is made regarding whether the boot was successful. If a determination is made that the boot was unsuccessful, a boot is reattempted utilizing a second boot code stored in a second storage device.

3 Claims, 3 Drawing Sheets

DATA PROCESSING SYSTEM AND METHOD FOR AUTOMATIC RECOVERY FROM AN UNSUCCESSFUL BOOT

BACKGROUND OF THE INVENTION

1. Field of the Invention

The present invention relates in general to data processing systems and, in particular, to a data processing system and method for automatically recovering from an unsuccessful boot of the system. Still more particularly, the present invention relates to a data processing system and method responsive to an unsuccessful boot of the system for utilizing a recovery copy of the boot code.

2. Description of the Related Art

Personal computer systems are well known in the art. They have attained widespread use for providing computer power to many segments of today's modern society. Personal computers (PCs) may be defined as a desktop, floor standing, or portable microcomputer that includes a system unit having a central processing unit (CPU) and associated volatile and non-volatile memory, including random access memory (RAM) and basic input/output system read only memory (BIOS ROM), a system monitor, a keyboard, one or more flexible diskette drives, a CD-ROM drive, a fixed disk storage drive (also known as a "hard drive"), a pointing device such as a mouse, and an optional network interface adapter. One of the distinguishing characteristics of these systems is the use of a motherboard or system planar to electrically connect these components together. Examples of such personal computer systems are IBM's PC series, Aptiva series, and Thinkpad series.

A computer system requires a basic input/output system (BIOS) in order to operate. The BIOS is code that controls basic hardware operations, such as interactions with disk drives, hard drives, and the keyboard.

When a computer is reset or initially powered-on, a boot process begins. First, POST begins executing. POST is an initialization code which configures the system utilizing initialization settings stored in storage, such as CMOS storage. Once POST has configured the system, BIOS then controls the basic operation of the hardware utilizing the hardware as it was configured by POST. The boot process is complete once an operating system has been handed control of the system. In order for the boot process to be complete, POST must complete its execution.

POST and BIOS are both typically stored as a single image in a storage device such as a flash memory. This image is commonly called the "boot code". If the image of POST and BIOS is corrupted, the boot of the system will not be able to be completed.

Therefore a need exists for a data processing system and method for automatically recovering from an unsuccessful boot of the system.

SUMMARY OF THE INVENTION

A data processing system and method are disclosed for automatically recovering from an unsuccessful boot of the system. A boot of the system is initiated utilizing a first boot code stored in a first storage location. A determination is made regarding whether the boot was successful. If a determination is made that the boot was unsuccessful, a boot is reattempted utilizing a second boot code stored in a second storage device.

The above as well as additional objectives, features, and advantages of the present invention will become apparent in the following detailed written description.

BRIEF DESCRIPTION OF THE DRAWINGS

The novel features are set forth in the appended claims. The present invention itself, however, as well as a preferred mode of use, further objectives, and advantages thereof, will best be understood by reference to the following detailed description of a preferred embodiment when read in conjunction with the accompanying drawings, wherein:

DETAILED DESCRIPTION OF A PREFERRED EMBODIMENT

Figure 1:
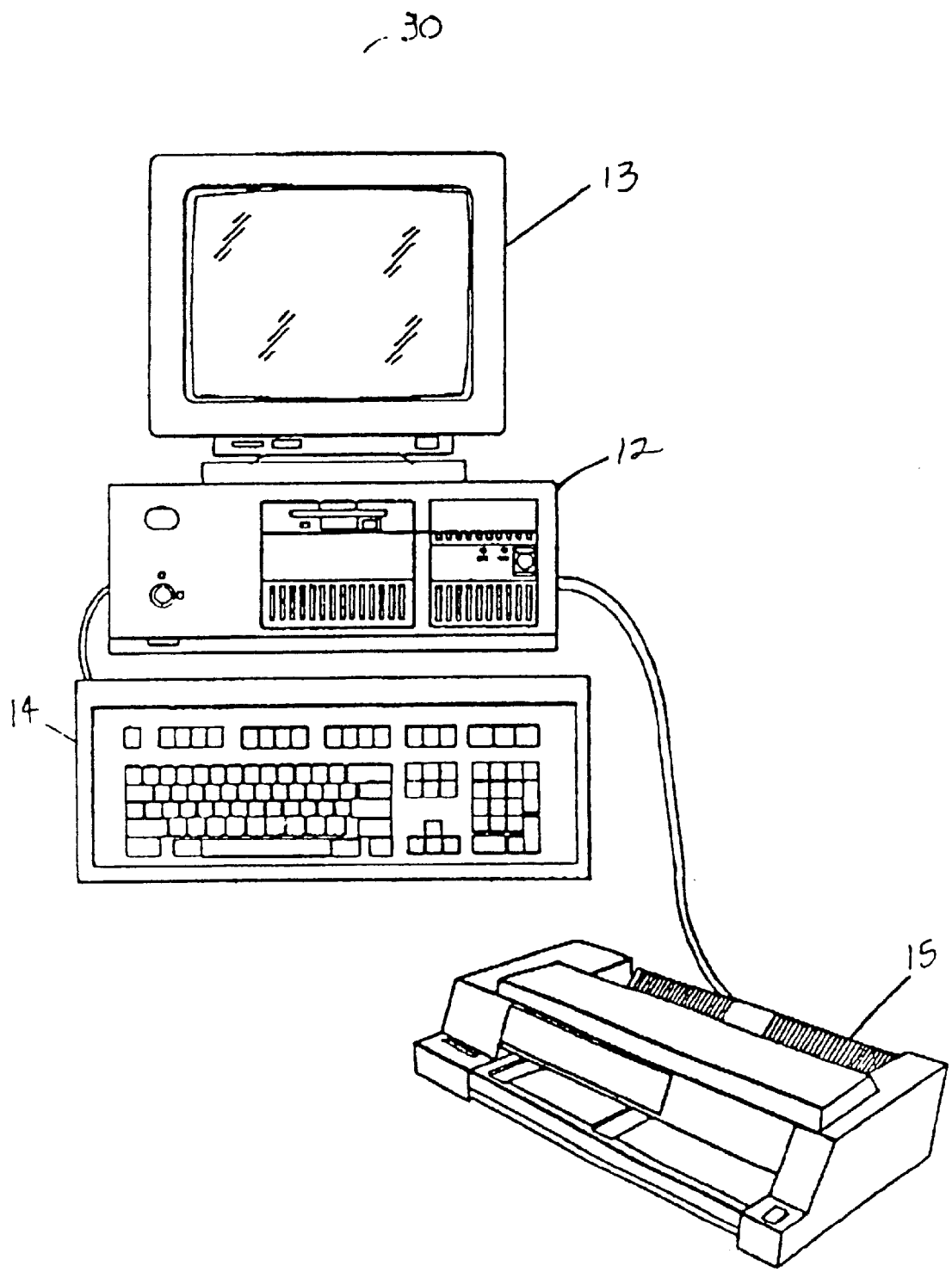
FIG. 1 illustrates a pictorial representation of a data processing system capable of automatically recovering from an unsuccessful boot in accordance with the method and system of the present invention.
Figure 2:
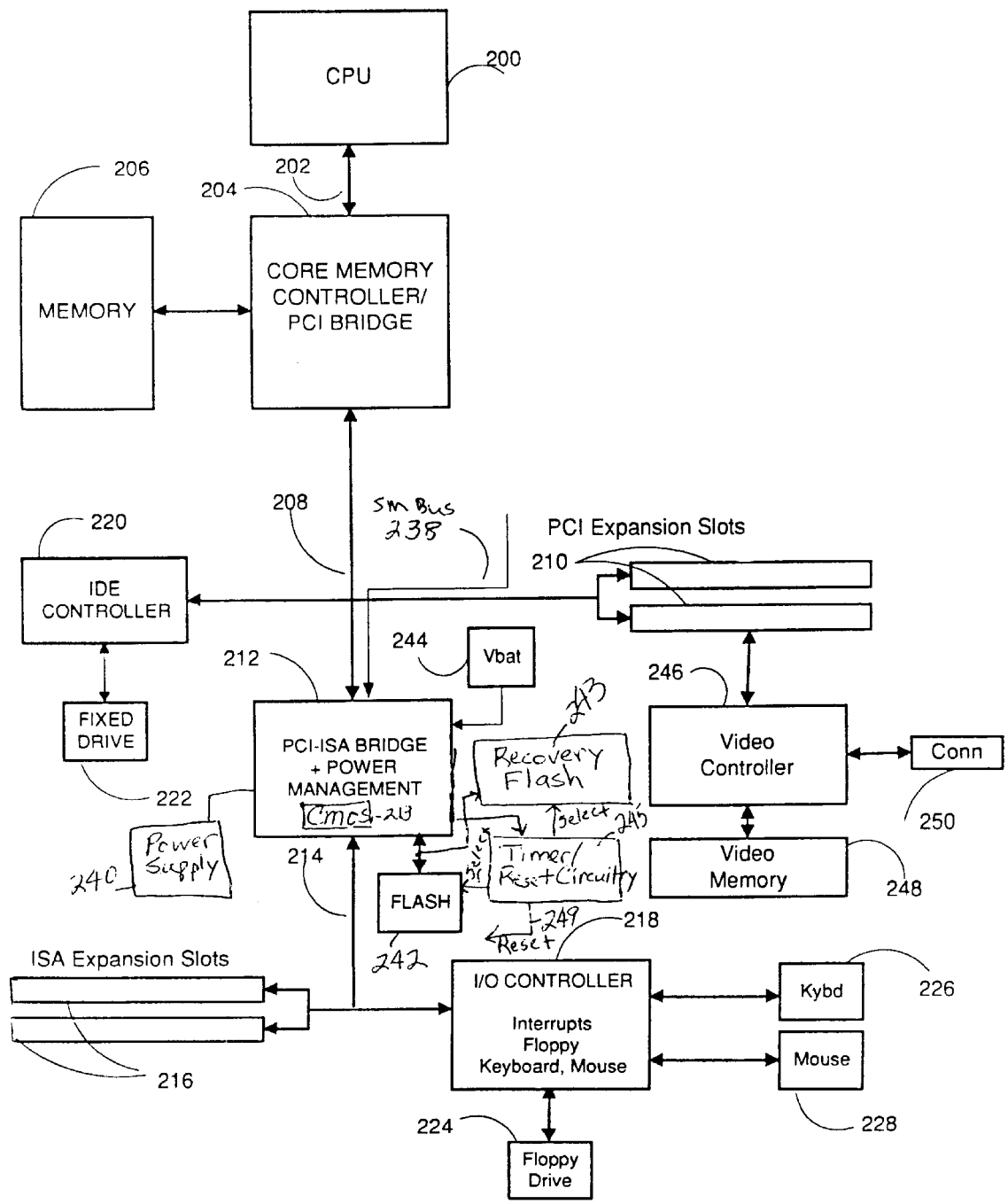
FIG. 2 depicts a more detailed pictorial representation of the data processing system of FIG. 1 in accordance with the method and system of the present invention.
Figure 3:
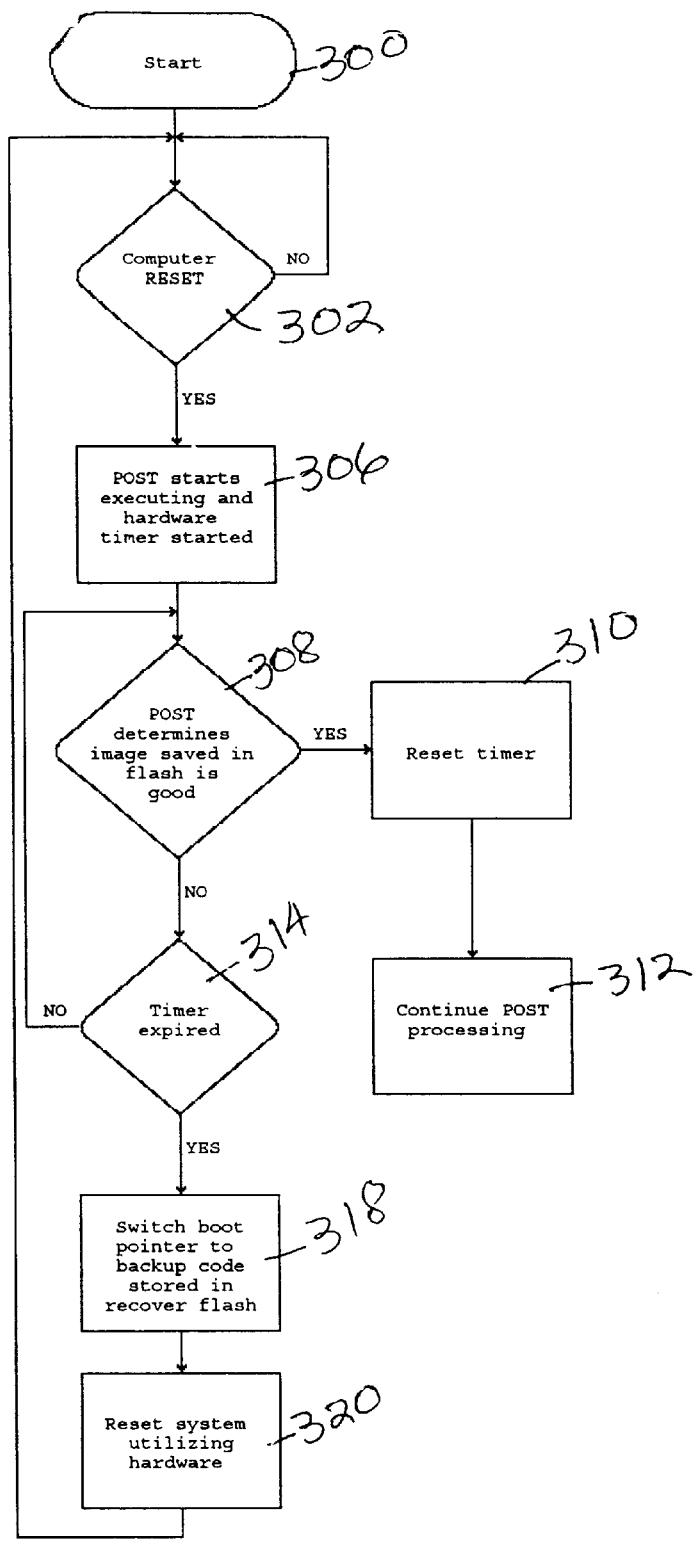
FIG. 3 illustrates a high level flow chart which depicts a reattempt to boot utilizing a second boot code in response to an initial boot utilizing a first boot code being unsuccessful in accordance with the method and system of the present invention.

A preferred embodiment of the present invention and its advantages are better understood by referring to FIGS. 1–3 of the drawings, like numerals being used for like and corresponding parts of the accompanying drawings.

The present invention is a method and system for automatically recovering from an unsuccessful boot of the system. A first storage device is included which stores a first boot code, and a second storage device is included which stores a second boot code. A boot pointer is also included which points to boot code to be utilized during a boot of the system. The boot pointer initially points to the first boot code.

An initial boot of the system is attempted utilizing the boot code pointed to by the boot pointer which initially is the first boot code. A hardware timer begins to run when a boot of the system is initially attempted. Thereafter, if the system determines that the first boot code is good prior to an expiration of time counted by the timer, the system will complete its boot utilizing the first code. However, if the time counted by the timer expires prior to a determination that the first boot code is good, the boot pointer is caused to point to the second boot code. The system is then reset. Upon being reset, the system reattempts a boot utilizing the boot code pointed to by the boot pointer which is now the second boot code.

FIG. 1 illustrates a pictorial representation of a data processing system capable of automatically recovering from an unsuccessful boot in accordance with the method and system of the present invention. Computer system 30 includes a computer 12, a monitor 13, a keyboard 14, and a printer or plotter 15. Computer system 30 may be implemented utilizing any commercially available computer system which has been suitably programmed and which has been modified as described below to include a recovery storage and timer/reset circuitry.

FIG. 2 depicts a more detailed pictorial representation of the data processing system of FIG. 1 in accordance with the method and system of the present invention. A central processing unit (CPU) 200 is connected by address, control, and data busses 202 to a memory controller and peripheral component interconnect (PCI) bus bridge 204 which is coupled to system memory 206. An integrated drive electronics (IDE) device controller 220, and a PCI bus to Industry Standard Architecture (ISA) bus bridge 212 are connected to PCI bus bridge 204 utilizing PCI bus 208. IDE controller 220 provides for the attachment of IDE compatible storage devices such as fixed disk drive 222. PCI/ISA bridge 212 provides an interface between PCI bus 208 and an optional feature or expansion bus such as the ISA bus 214. PCI/ISA bridge 212 includes power management logic. A PCI standard expansion bus with connector slots 210 is coupled to PCI bridge 204. PCI connector slots 210 may receive PCI bus compatible peripheral cards. An ISA standard expansion bus with connector slots 216 is connected to PCI/ISA bridge 212. ISA connector slots 216 may receive ISA compatible adapter cards (not shown). It will be appreciated that other expansion bus types may be used to permit expansion of the system with added devices. It should also be appreciated that two expansion busses are not required to implement the present invention.

An I/O controller 218 is coupled to PCI-ISA bridge controller 212. I/O controller 218 controls communication between PCI-ISA bridge controller 212 and devices and peripherals such as floppy drive 224, keyboard 226, and mouse 228 so that these devices may communicate with CPU 200.

PCI-ISA bridge controller 212 includes an interface for a flash memory which includes an interface for generating and receiving address, data, flash chip select, and read/write signals. The data and address signals are shared between a first flash 242 and a second, or recovery, flash memory 243. Within first flash 242 is stored an initial boot microcode which computer 30 executes upon power-on. Within second flash 243 is stored a recover boot microcode which computer 30 executes in the event computer 30 as unable to boot utilizing a first, or initial, boot microcode. Flash memories 242 and 243 are electrically erasable programmable read only memory (EEPROM) modules and include BIOS that is used to interface between the I/O devices and operating system. Flash memory 242 includes a first copy of boot microcode, while flash memory 243 includes a second copy of boot microcode.

Those skilled in the art will recognize that flash 242 and flash 243 could be implemented utilizing a single flash memory device having two separate pages. In this manner, one page stores the initial boot microcode and is utilized as a primary image, and the second page stores the recovery boot microcode and is utilized as a secondary image.

A timer/reset circuitry 245 is included and provides to both flash 242 and flash 243 a chip select. Bridge 212 provides a flash chip select signal to logic 245. Logic 245 re-drives the select signal to flash 242, thereby enabling primary flash 242. Timer/reset circuitry 245 outputs a system reset signal 249 which is received by bridge 212 to reset computer 30. Timer/reset circuitry 245 generates the reset signal in response to POST causing general purpose I/O (GPIO) of bridge 212 to output a reset signal to logic 245. Circuitry 245 also includes a timer which is reset and read by code executing within computer 30 as described below. When the time counted by circuitry 245 expires, circuitry 245 will output a signal 249 to reset system 30 and change re-drive signal from a signal to select flash 242 to a signal to select flash 243.

PCI-ISA bridge controller 212 also includes storage 213, which is preferably implemented utilizing CMOS storage, that holds the BIOS settings. A flash memory as utilized herein is storage which is utilized to stored both BIOS and POST code. Storage 213 includes initialization settings which describe the present configuration of computer 30. For example, storage 213 includes information describing the list of initial program load (IPL) devices set by a user and the sequence to be used for a particular power method, the type of display, the amount of memory, time date, etc. Furthermore, this data is stored in storage 213 whenever a special configuration program, such as configuration/setup is executed. PCI-ISA bridge controller 204 is supplied power from battery 244 to prevent loss of configuration data in storage 213.

Computer system 30 includes a video controller 246 which may, for example, be plugged into one of connector slots 210. Video controller 246 is connected to video memory 248. The image in video memory 248 is read by controller 246 and displayed on a monitor (not shown) which is connected to computer 30 through connector 250.

Computer system 30 includes a power supply 240 which supplies full normal system power, and has an auxiliary power main AUX 5 which supplies full time power to the power management logic 212 and to the network adapter 230.

FIG. 3 illustrates a high level flow chart which depicts a reattempt to boot utilizing a second boot code in response to an initial boot utilizing a first boot code being unsuccessful in accordance with the method and system of the present invention. The process starts as depicted by block 300 and thereafter passes to block 302 which illustrates a determination of whether or not the computer system has been reset. If a determination is made that the computer system has not been reset, the process passes back to block 302. If a determination is made that the computer system has been reset, the process passes to block 306 which depicts POST starting execution. The POST commands will execute utilizing the boot code pointed to by the boot pointer. After computer system 30 is reset, the boot pointer is initially set to point to the initial boot code stored in flash 242. Block 306 also illustrates a starting of hardware timer 245. Thereafter, block 308 depicts a determination of whether or not a predefined POST checkpoint has been reached. Preferably, the predefined POST checkpoint is a determination of whether the boot code image stored flash 242 is good.

If a determination is made that the boot code image stored in flash 242 is good, the process passes to block 310 which illustrates resetting timer 245 utilizing GPIO from bridge 212 to logic 245. The process then passes to block 312 which depicts a continuation of normal POST processing. Block 312 depicts computer system 30 booting as typically known utilizing the initial boot code stored in flash 242.

Referring again to block 308, if a determination is made that POST has not yet determined that the boot code image stored in flash 242 is good, the process passes to block 314 which illustrates a determination of whether or not timer 245 has expired. If a determination is made that timer 245 has not expired, the process passes back to block 308.

Referring again to block 314, if a determination is made that timer 245 has expired, the process passes to block 318 which depicts the switching of the boot pointer from the initial boot code stored in flash 242 to recovery boot code stored in flash 243. Next, block 320 depicts the resetting of computer system 30 utilizing hardware timer/reset circuitry 245. The process then passes back to block 302. When the process is then re-executed, the initial POST execution will utilize the recovery boot code stored in flash 243 instead of the initial boot code stored in flash 242.

While a preferred embodiment has been particularly shown and described, it will be understood by those skilled in the art that various changes in form and detail may be made therein without departing from the spirit and scope of the present invention.

What is claimed is:

1. A method in a data processing system for automatically recovering from an unsuccessful boot of said system, said method comprising the steps of:

initiating a boot of said system utilizing a first boot code stored in a first storage device;

determining whether said boot of said system was successful;

in response to a determination that said boot was unsuccessful, automatically reattempting a boot of said system utilizing a second boot code stored in a second storage device;

determining whether said first boot code is good;

in response to a determination that said first boot is good, booting said system utilizing said first boot code;

determining whether said first boot code is good further comprises the step of determining whether said first boot code is good prior to an expiration of time counted by said timer;

in response to an expiration of said timer counted by said timer prior to a determination that said first boot code is good, automatically reattempting said boot of said system utilizing said second boot code;

establishing a boot pointer, said boot pointer pointing to said first boot code in said first storage device when said system is initially reset, said system executing boot code pointed to by said boot pointer during said boot of said system;

in response to an expiration of said time counted by said timer prior to a determination that said first boot code is good, causing said boot pointer to point to said second boot code in said second storage device, wherein said system utilizes said second boot code during a boot of said system;

in response to said time counted by said timer not expiring prior to a determination that said first boot code is good, resetting said timer;

continuing said boot of said system;

resetting said system in response to an expiration of said time counted by said timer prior to a determination that said first boot code is good, wherein said boot pointer points to said second boot code; and said reattempted boot of said system utilizing said second boot code.

2. A data processing system for automatically recovering from an unsuccessful boot of said system, comprising:

a processing unit executing code for initiating a boot of said system utilizing a first boot code stored in a first storage device;

said processing unit executing code for determining whether said boot of said system was successful;

in response to a determination that said boot was unsuccessful, said processing unit executing code for automatically reattempting a boot of said system utilizing a second boot code stored in a second storage device;

said processing unit executing code for determining whether said first boot code is good;

in response to a determination that said first boot is good, said processing unit executing code for booting said system utilizing said first boot code;

a timer included within said system for counting a time, said processing unit executing code for determining whether said first boot code is good prior to an expiration of said time counted by said timer;

said processing unit executing code responsive to an expiration of said time counted by said timer prior to a determination that said first boot code is good, for automatically reattempting said boot of said system utilizing said second boot code;

said processing unit executing code for establishing a boot pointer, said boot pointer pointing to said first boot code in said first storage device when said system is initially reset, said system executing boot code pointed to by said boot pointer during said boot of said system;

said processing unit executing code responsive to an expiration of said time counted by said timer prior to a determination that said first boot code is good, for causing said boot pointer to point to said second boot code in said second storage device, wherein said system utilizes said second boot code during a boot of said system;

said processing unit executing code responsive to said time counted by said timer not expiring prior to a determination that said first boot code is good, for resetting said timer;

said processing unit executing code for continuing said boot of said system;

a reset circuitry for resetting said system in response to an expiration of said time counted by said timer prior to a determination that said first boot code is good, wherein said boot pointer points to said second boot code; and said processing unit executing code for said reattempted boot of said system utilizes said second boot code.

3. A data processing system for automatically recovering from an unsuccessful boot of said system, comprising:

a first storage device for storing a first boot code;

a second storage device for storing a second boot code;

a timer for counting a time;

a reset circuitry for resetting said system;

a boot pointer for pointing to boot code to be utilized during a boot of said system, said boot pointer initially pointing to said first boot code;

said system capable of initiating a boot of said system utilizing boot code pointed to by said boot pointer, wherein said first boot code stored in said first storage device is utilized by said system during said initial boot of said system;

said system capable of determining whether said first boot code is good prior to an expiration of said time;

said system capable of in response to an expiration of said time prior to a determination that said first boot code is good, causing said boot pointer to point to said second boot code;

said reset circuitry resetting said system in response to an expiration of said time prior to a determination that said first boot code is good; and said system capable of said system reattempting a boot in response to being reset utilizing boot code pointed to be said boot pointer, where said second boot code is utilized by said system during said reattempted boot.

* * * * *